(12) United States Patent
Reineke et al.

(10) Patent No.: US 11,514,407 B2
(45) Date of Patent: Nov. 29, 2022

(54) SYSTEM AND METHOD FOR ASSET MANAGEMENT

(71) Applicant: EMC IP Holding Company LLC, Hopkinton, MA (US)

(72) Inventors: Nicole Reineke, Northborough, MA (US); Robert Anthony Lincourt, Jr., Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 16/743,347

(22) Filed: Jan. 15, 2020

(65) Prior Publication Data
US 2021/0216973 A1    Jul. 15, 2021

(51) Int. Cl.
*G06Q 10/00* (2012.01)
*G07C 9/00* (2020.01)
*G06Q 10/06* (2012.01)
*G06F 8/60* (2018.01)

(52) U.S. Cl.
CPC ............ *G06Q 10/20* (2013.01); *G06Q 10/06* (2013.01); *G06Q 10/0631* (2013.01); *G07C 9/00912* (2013.01); *G06F 8/60* (2013.01)

(58) Field of Classification Search
CPC combination set(s) only.
See application file for complete search history.

(56) References Cited

U.S. PATENT DOCUMENTS

| | | | |
|---|---|---|---|
| 7,504,949 B1* | 3/2009 | Rouaix | G06Q 10/06 340/572.1 |
| 10,563,429 B1* | 2/2020 | Bailey | E05B 35/008 |
| 2007/0222597 A1* | 9/2007 | Tourrilhes | G06Q 10/06 340/572.1 |
| 2008/0256241 A1* | 10/2008 | Graser | G06Q 10/10 709/226 |
| 2008/0295100 A1* | 11/2008 | Ainsworth | G06Q 10/06 718/102 |
| 2008/0295106 A1* | 11/2008 | Gissel | G06F 8/60 718/104 |
| 2009/0276728 A1* | 11/2009 | Doan | G06Q 10/10 715/810 |

(Continued)

OTHER PUBLICATIONS

H. Yi, L. Xiongjian, Z. Wenjian and F. Lei, "Operation and Maintenance System of Public Cloud Service," 2013 International Conference on Cloud Computing and Big Data, 2013, pp. 84-91, doi: 10.1109/CLOUDCOM-ASIA.2013.84. (Year: 2013).*

(Continued)

*Primary Examiner* — Crystol Stewart
(74) *Attorney, Agent, or Firm* — Chamberlain, Hrdlicka, White, Williams & Aughtry

(57) ABSTRACT

A deployment manager for managing a deployment includes storage for storing an asset management request and an asset manager. The asset manager obtains the asset management request for an asset of the deployment; in response to obtaining the asset management request: places the asset into a management mode that enables at least one physical component of the asset to be physically managed; manages the asset based on the asset management request while in the management mode; and places the asset into an active mode that disables the at least one physical component of the asset to be physically managed.

16 Claims, 12 Drawing Sheets

(56) References Cited

U.S. PATENT DOCUMENTS

| | | | |
|---|---|---|---|
| 2012/0005609 A1* | 1/2012 | Ata | G06F 11/0709 |
| | | | 715/771 |
| 2013/0158892 A1* | 6/2013 | Heron | G06F 11/3055 |
| | | | 702/34 |
| 2014/0215029 A1* | 7/2014 | Terwilliger | H04L 41/0803 |
| | | | 709/220 |
| 2016/0013992 A1* | 1/2016 | Reddy | G06F 8/61 |
| | | | 709/224 |
| 2018/0165658 A1* | 6/2018 | Yokochi | G06Q 10/20 |
| 2019/0147412 A1* | 5/2019 | Chiaramonte | G06Q 10/06311 |
| | | | 705/7.13 |
| 2019/0392148 A1* | 12/2019 | Ganesan | G06F 9/4401 |

OTHER PUBLICATIONS

B. Calio, D. Wyskida and M. Frissora, "Integrating RFID technology to improve IT asset management controls, playing an integral part in datacenter relocation," 2011 8th International Conference & Expo on Emerging Technologies for a Smarter World, 2011, pp. 1-6, doi: 10.1109/CEWIT.2011.6135868. (Year: 2011).*

Washington University in St. Louis; "Enabling 'internet of photonic things' with miniature sensors"; ScienceDaily Sep. 12, 2018. (www.sciencedaily.com/releases/2018/09/180912144403.htm).

* cited by examiner

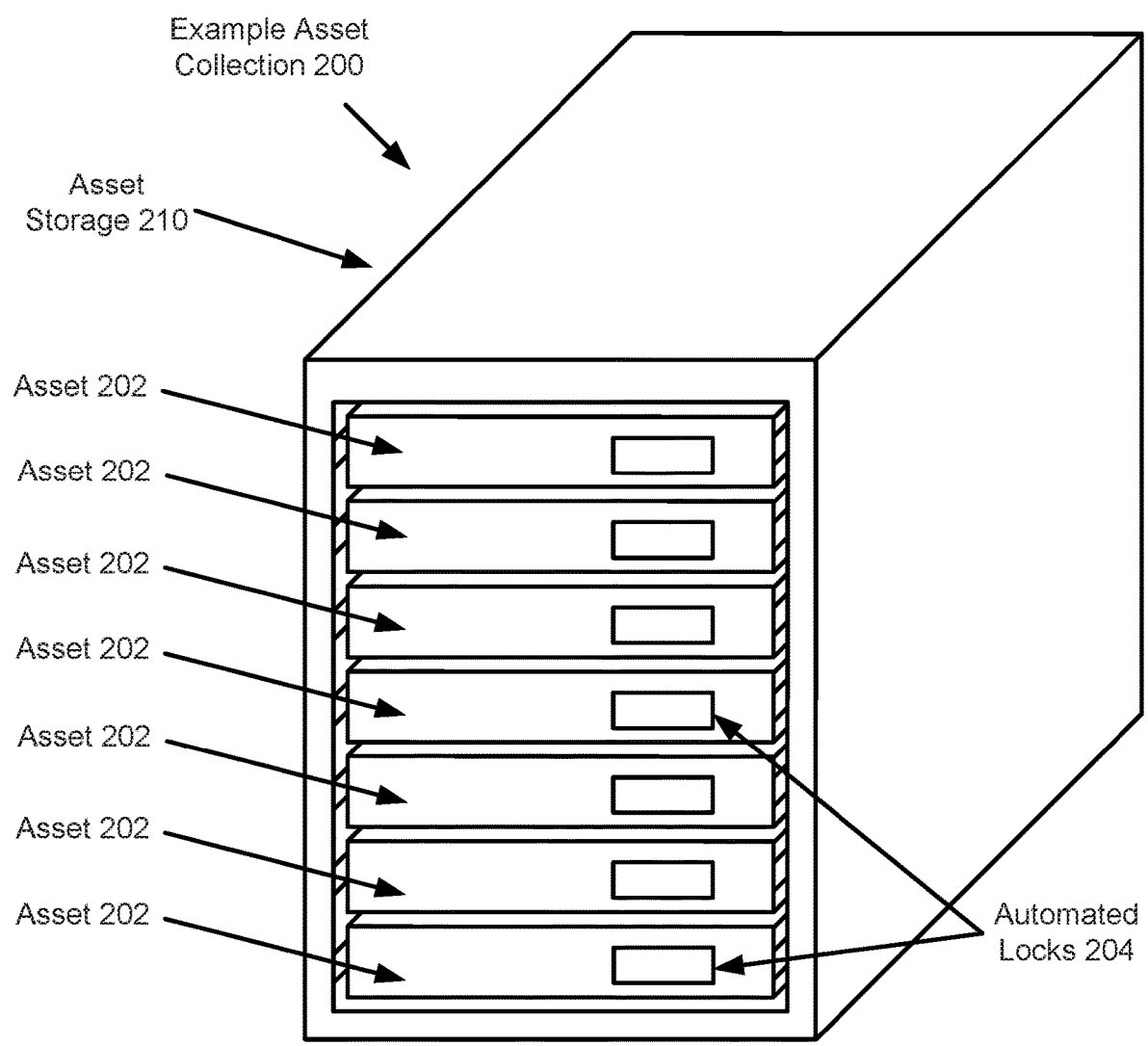
FIG. 2.1

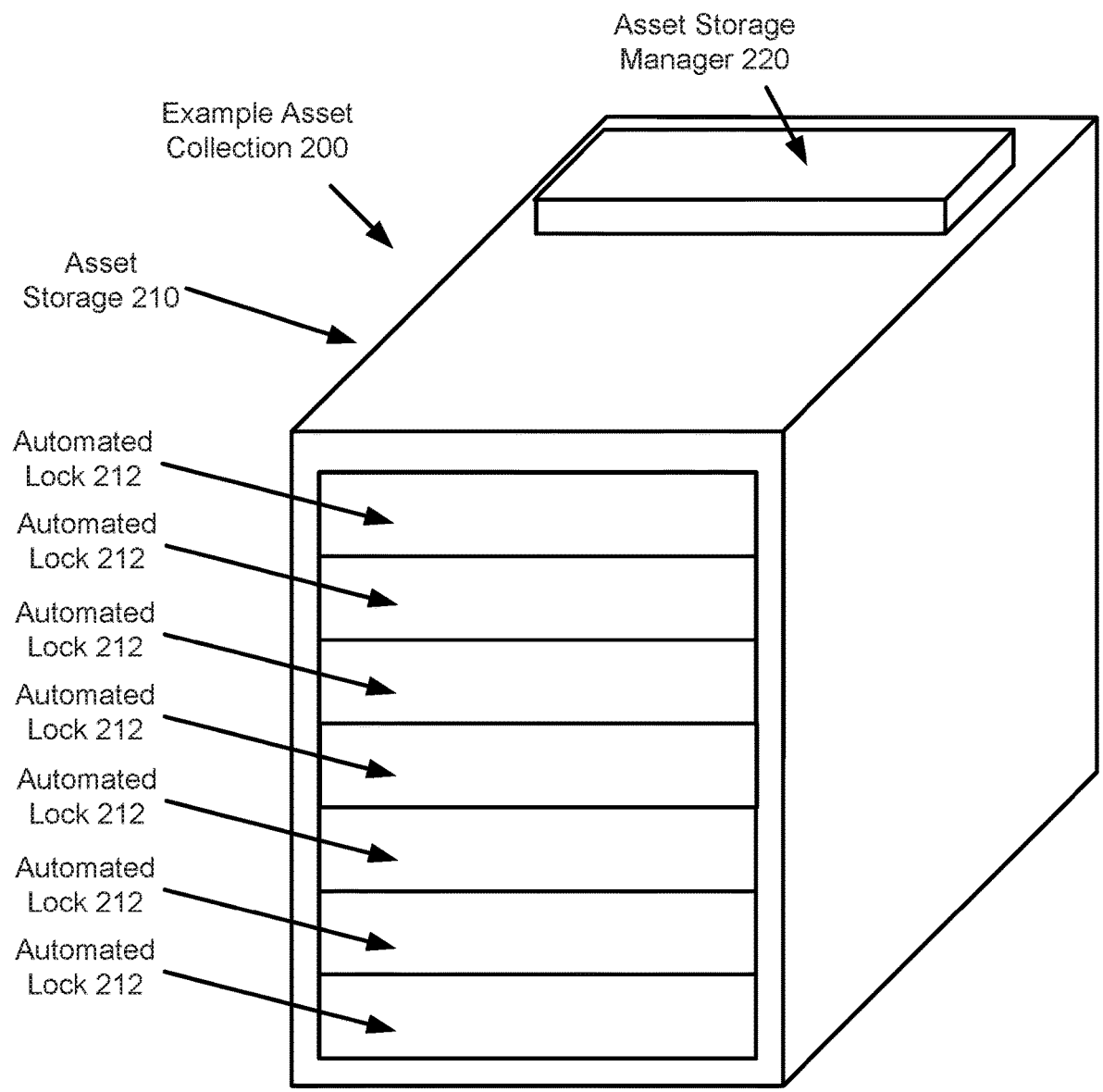
FIG. 2.2

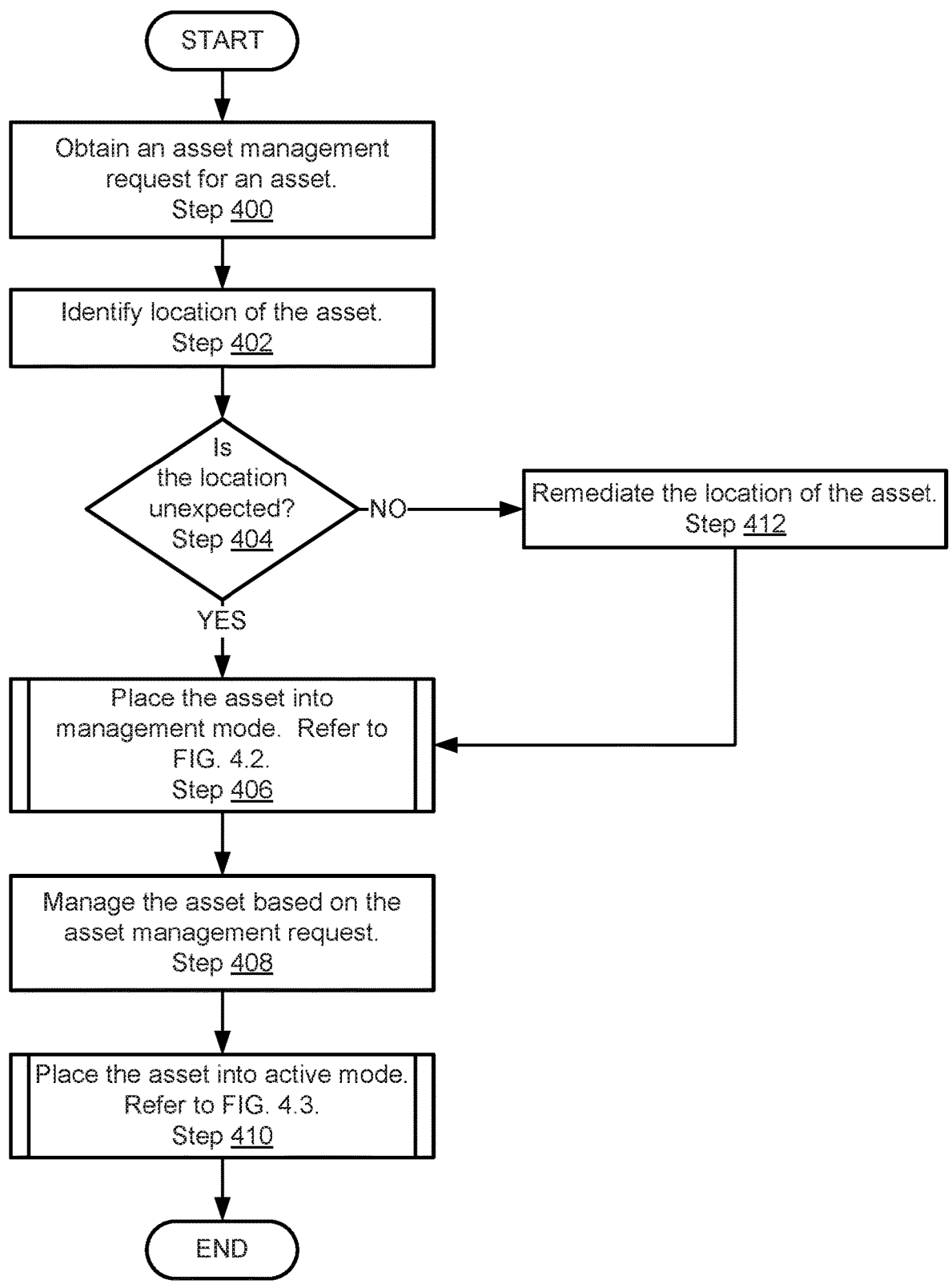
FIG. 4.1

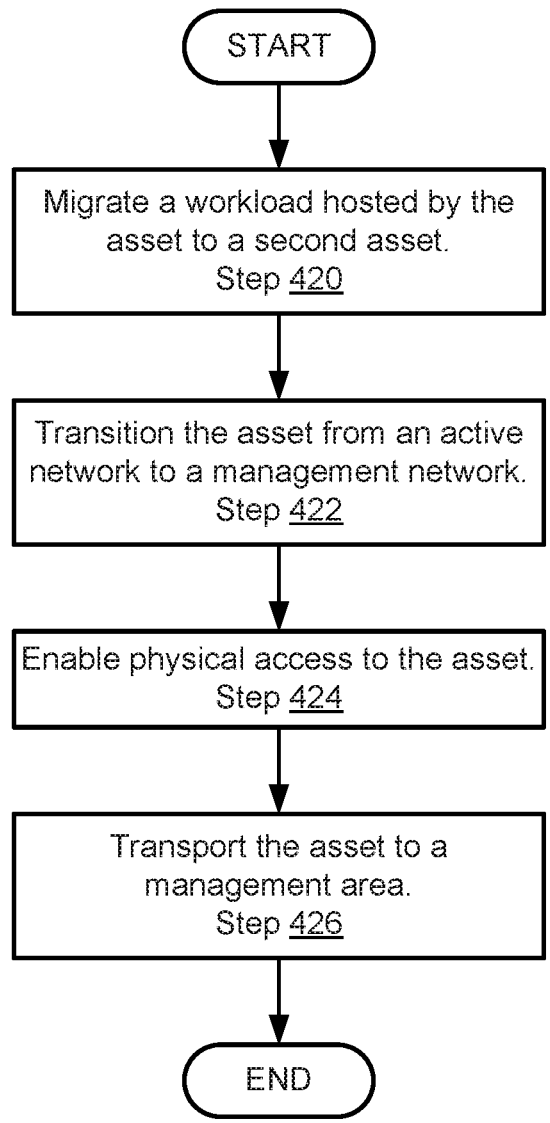
FIG. 4.2

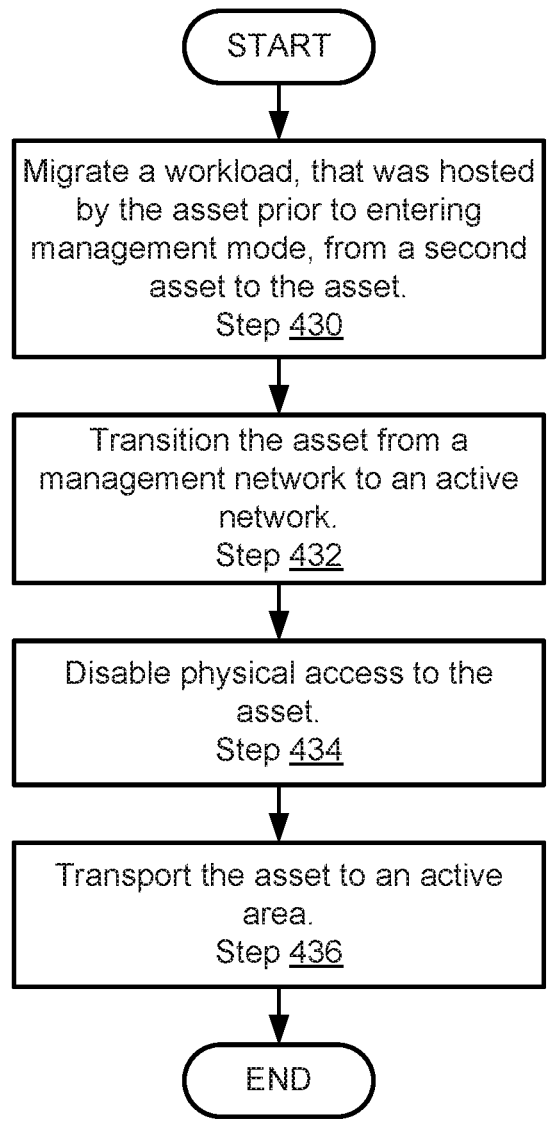
FIG. 4.3

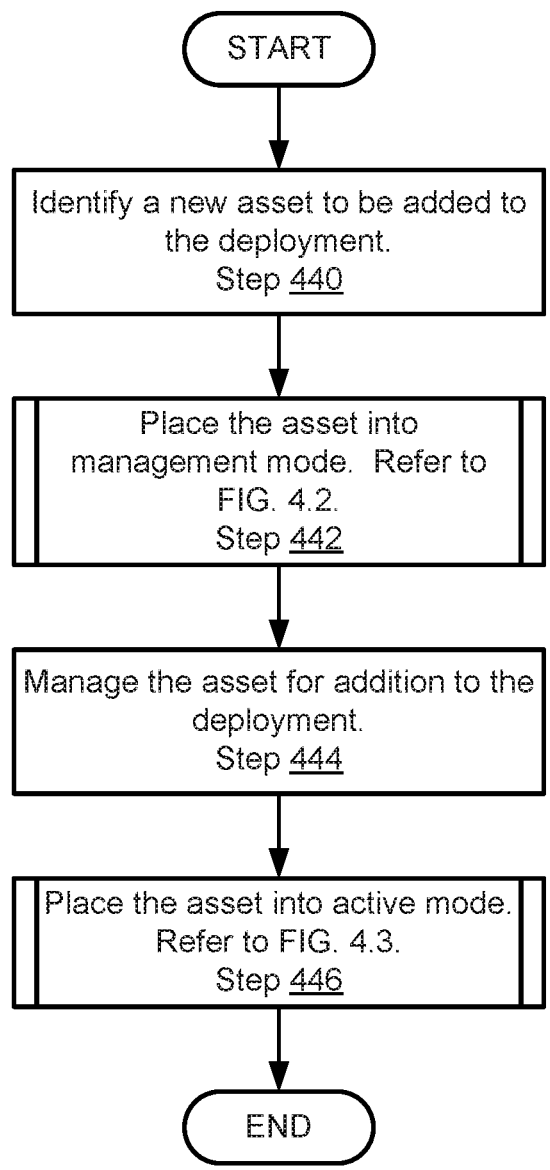
FIG. 4.4

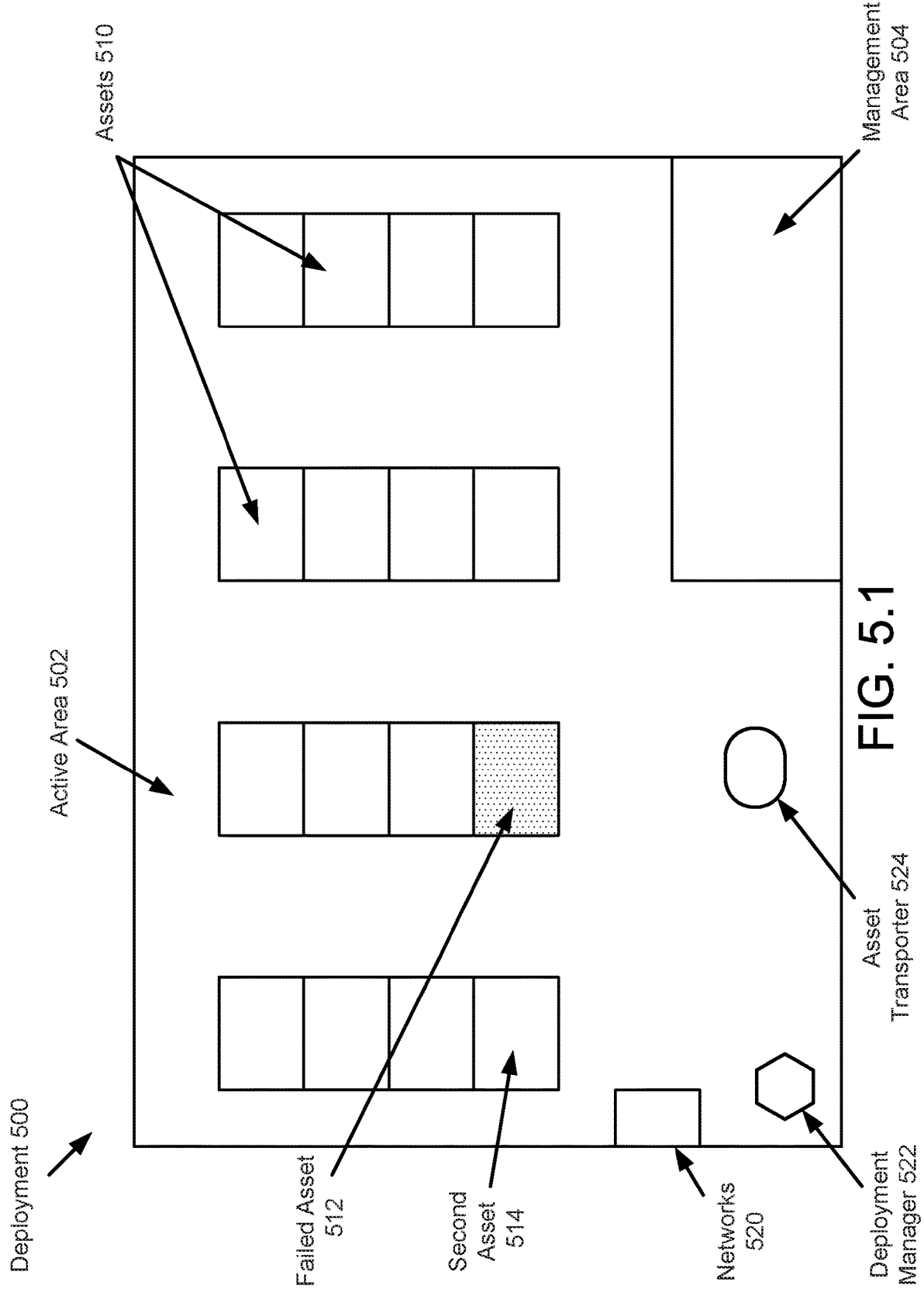
FIG. 5.1

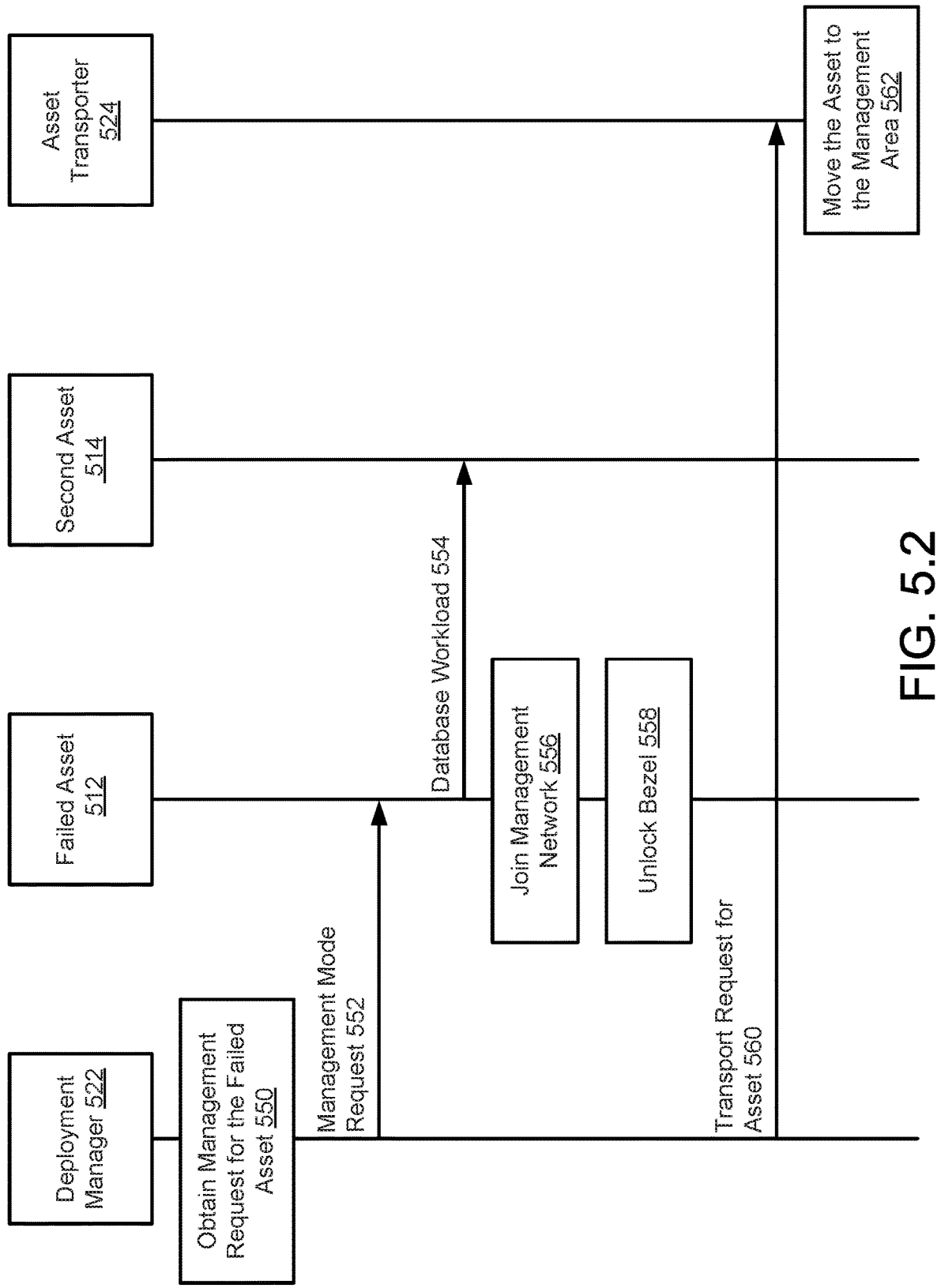
FIG. 5.2

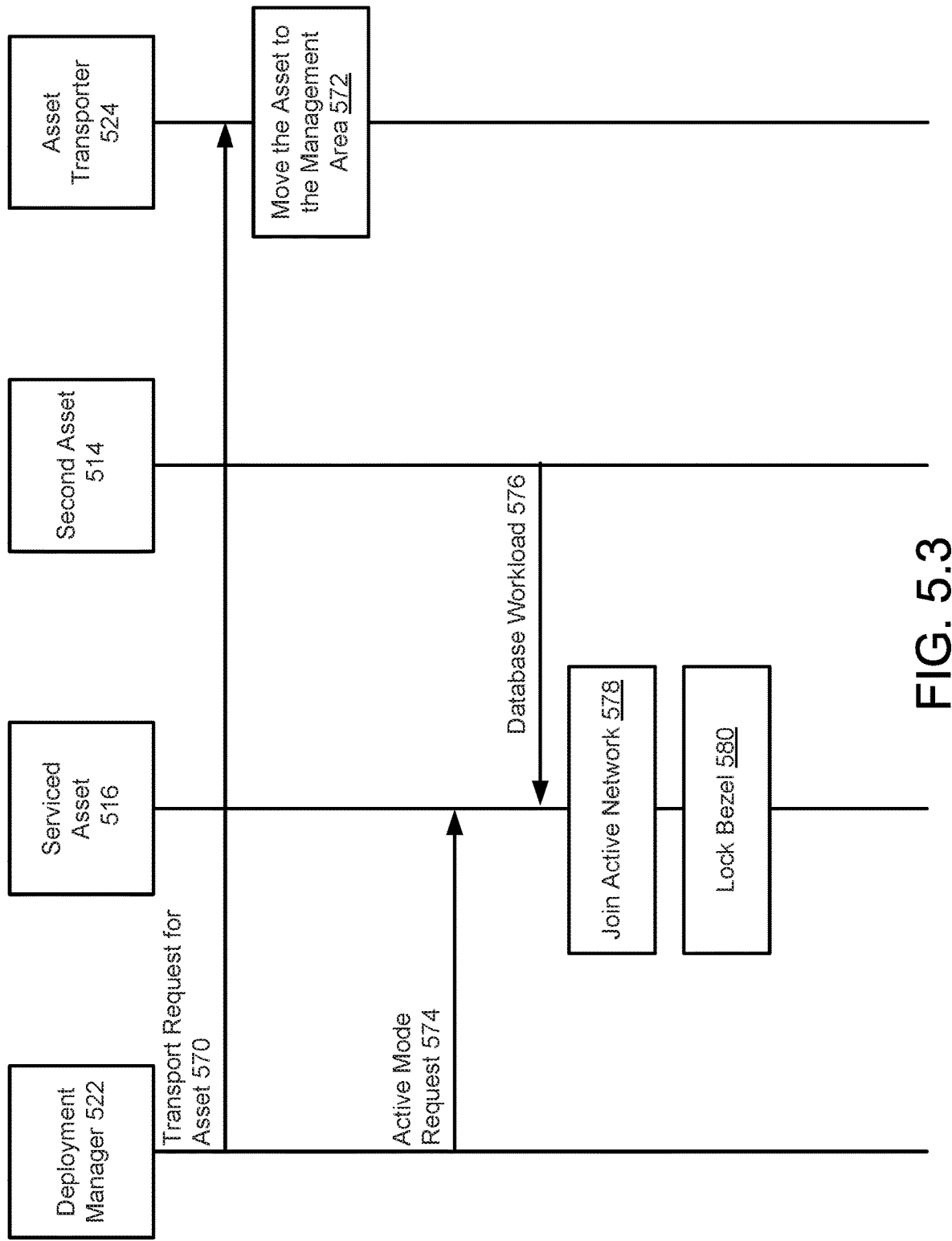
FIG. 5.3

SYSTEM AND METHOD FOR ASSET MANAGEMENT

BACKGROUND

Computing devices may provide services. To provide services, computing devices may include hardware and software components. The software components may utilize computational resources provided by the hardware components of the computing devices to operate. The number, type, and quantity of hardware and software components may impact the type and quantity of services provided by the computing devices.

SUMMARY

In one aspect, a deployment manager for managing a deployment in accordance with one or more embodiments of the invention includes storage for storing an asset management request and an asset manager. The asset manager obtains the asset management request for an asset of the deployment; in response to obtaining the asset management request: places the asset into a management mode that enables at least one physical component of the asset to be physically managed; manages the asset based on the asset management request while in the management mode; and places the asset into an active mode that disables the at least one physical component of the asset to be physically managed.

In one aspect, a method for managing a deployment in accordance with one or more embodiments of the invention includes obtaining an asset management request for an asset of the deployment; in response to obtaining the asset management request: placing the asset into a management mode that enables at least one physical component of the asset to be physically managed; managing the asset based on the asset management request while in the management mode; and placing the asset into an active mode that disables the at least one physical component of the asset to be physically managed.

In one aspect, a non-transitory computer readable medium in accordance with one or more embodiments of the invention includes computer readable program code, which when executed by a computer processor enables the computer processor to perform a method for managing a deployment. The method includes obtaining an asset management request for an asset of the deployment; in response to obtaining the asset management request: placing the asset into a management mode that enables at least one physical component of the asset to be physically managed; managing the asset based on the asset management request while in the management mode; and placing the asset into an active mode that disables the at least one physical component of the asset to be physically managed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example asset collection in accordance with one or more embodiments of the invention.

FIG. 2.2 shows a second diagram of an example asset collection in accordance with one or more embodiments of the invention.

FIG. 4.1 shows a flowchart of a method of managing a deployment in accordance with one or more embodiments of the invention.

FIG. 4.2 shows a flowchart of a method of placing an asset into a management mode in accordance with one or more embodiments of the invention.

FIG. 4.3 shows a flowchart of a method of placing an asset into an active mode in accordance with one or more embodiments of the invention.

FIG. 4.4 shows a flowchart of a method of managing a new asset to be added to a deployment in accordance with one or more embodiments of the invention.

FIG. 5.1 shows a diagram of an example system at a first point in time.

FIGS. 5.2-5.3 show diagrams of interactions between and actions performed by components of the example system of FIG. 5.1 over time.

DETAILED DESCRIPTION

Figure 1:
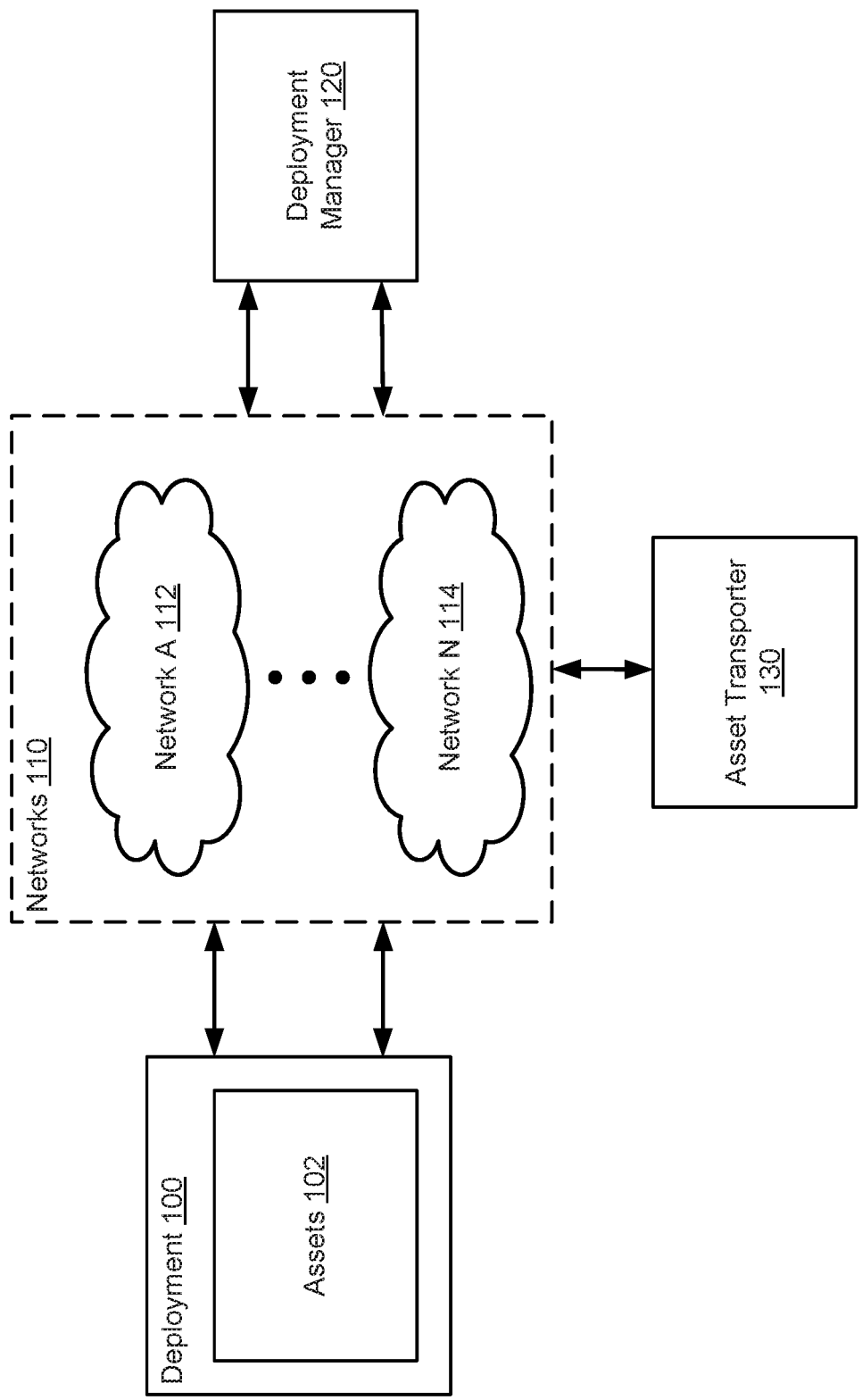
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing deployments. A deployment may include any number of assets. An asset may be a collection of hardware devices that hosts applications and/or stores data. The assets of the deployment may cooperate to provide functionalities of the deployment.

To manage a deployment, it may be necessary to service assets of the deployment. Servicing an asset may include, for example, replacing, removing, modifying, and/or adding hardware and/or software components. However, doing so may impact the operation of the deployment. For example, replacing a hardware component may prevent the asset from performing a workload necessary for the deployment to provide or more of its functionalities.

Embodiments of the invention may provide a method and system for servicing assets of a deployment in a manner that reduces the likelihood that servicing of the assets negatively impacts the deployment. To do so, a system in accordance with embodiments of the invention may, when servicing an asset, do one or more of (i) automatically transfer workloads from the asset, (ii) segregate the asset from an active network utilized by the deployment to a management network, (iii) facilitate physical access to components of the asset that is otherwise disable, and (iv) physically transport the asset from an active area in which assets of the deployment are disposed to a management area. By doing so, the likelihood that the operation of the deployment will be negatively impacted by servicing of the asset may be reduced.

FIG. 1 shows a system in accordance with one or more embodiments of the invention. The system may include a deployment (100) that provides computer implemented services. The computer implemented services may include, for example, database services, data storage services, electronic communications services, and/or other types of services that may be implemented using computing devices.

To provide the computer implemented services, the deployment (100) may include any number of asset (102). An asset may include hardware components to facilitate computer implemented services provided by the deployment (100) and an enclosure for storing the hardware components.

An enclosure may be, for example, a rack mountable chassis or another type of form factor compliant enclosure. Different assets may include different types and/or number of hardware devices.

For example, an asset may include a computing device disposed in a chassis. The computing device may include a processor, memory module, storage device, communications processor, and/or other types of hardware devices. For additional details regarding computing devices, refer to FIG. 6. The aforementioned asset may provide a combination of processing resources, memory resources, storage resources, etc. that are utilized to provide computer implemented services. However, other assets may be adapted to only provide a single type of computing resources, e.g., storage resources, memory resources, etc., by including only a limited number and/or type of hardware devices.

To enable the assets to be arranged with respect to each other, the assets of the deployment (100) may be disposed in structures such as racks. The assets may be disposed in any number of such structures. Different numbers and/or types of assets may be disposed in different structures.

The system may further include a deployment manager (120) that manages the assets of the deployment (100). The deployment manager (120) may manage the assets (102) of the deployment by managing repair processes, update processes, and/or other processes used to maintain and/or modify the operation of the assets (102). By managing the assets (102), the deployment (100) may continue to provide computer implemented services in a prescribed manner.

To facilitate management of the assets (102), the system may include multiple networks (110) and an asset transporter (130). The networks (e.g., 112, 114) may enable the assets (102) to (i) operably connect to each other and other entities and (ii) be segregated from the other assets of the deployment (100) while being modified and/or when operating in an undesirable manner.

The asset transporter (130) may provide asset transportation services. Transportation services may include moving assets between active areas in which assets (102) that are operating as part of the deployment (100) are disposed and management areas in which assets that are not operating as part of the deployment (100) (e.g., being serviced by technicians) are disposed.

The components of the system of FIG. 1 may be operably connected to each other and/or other entities via any combination of wired and/or wireless networks (e.g., 112, 114). Each of the components of the system of FIG. 1 are discussed below.

The assets (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the assets (102) described in this application and/or all, or a portion, of the methods illustrated in FIGS. 4.1-4.4. The assets (102) may be implemented using other types of computing devices without departing from the invention. For additional details regarding computing devices, refer to FIG. 6.

The assets (102) may be implemented using logical devices without departing from the invention. For example, the assets (102) may be implemented using virtual machines that utilize computing resources of any number of physical computing devices (e.g., refer to FIG. 6) to provide their respective functionalities. The assets (102) may be implemented using other types of logical devices without departing from the invention.

In one or more embodiments of the invention, the assets (102) provide any number of computer implemented services. The computer implemented services may include, for example, file storage services, database services, electronic communication services, etc. The assets (102) may provide other types of computer implemented services without departing from the invention. Each of the assets of the deployment (100) may provide similar and/or different computer implemented services. Any number of the assets may cooperatively provide computer implemented services.

In one or more embodiments of the invention, the assets (102) facilitate their management. To facilitate, the assets (102) may shift between operating modes. In an active operating mode, the assets (102) may (i) provide computer implemented service, (ii) operably connect to an active network over which all, or a portion, of the other assets of the deployment are reachable, and/or (iii) prevent hardware components (e.g., processors, memory modules, persistent storage devices, etc.) of the assets from being physically accessed. In a management operating mode, the assets (102) may (i) suspend providing computing implemented services, (ii) disconnect from the active network, (iii) operably connect to a management network over which diagnostic and/or other resources may be operably connected, and/or (iv) enable hardware components (e.g., processors, memory modules, persistent storage devices, etc.) of the assets from being physically accessed. The assets (102) may switch between the aforementioned modes in response to messages that indicate transitioning between the aforementioned modes.

The deployment manager (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment manager (120) described in this application and/or all, or a portion, of the methods illustrated in FIGS. 4.1-4.4. The deployment manager (120) may be implemented using other types of computing devices without departing from the invention. For additional details regarding computing devices, refer to FIG. 6.

The deployment manager (120) may be implemented using logical devices without departing from the invention. For example, the deployment manager (120) may be implemented using virtual machines that utilize computing resources of any number of physical computing devices (e.g., refer to FIG. 6) to provide their respective functionalities. The deployment manager (120) may be implemented using other types of logical devices without departing from the invention.

In one or more embodiments of the invention, the deployment manager (120) provides deployment management services (100). Deployment management services may include (i) managing the addition of assets to the deployment (100), (ii) managing remove of assets from the deployment (100), and/or (iii) managing servicing of the assets (102) of the deployment (100).

To manage servicing of an asset, the deployment manager (120) may (i) migrate workloads from the asset that is going to be serviced to other assets of the deployment (100) and migrate the workloads back to the asset after being serviced, (ii) temporarily transition the asset between an active network and a management network during servicing, (iii) enable physical access to portions of the asset during servicing, and (iv) transport the asset between an active area and a management area during servicing. By doing so, access to the deployment (100) may be limited during servicing asset. Consequently, the likelihood of the deployment (100) being impacted by the servicing of the asset may be reduced. Accordingly, the quality of services provided by the deployment (100) may be maintained during servicing of the assets (102) of the deployment (100).

The asset transporter (130) may be implemented as a physical device such, for example, a robotic system. The asset transporter (130) may include wheels, motors for driving the wheels, grippers or other types of devices for physical interacting with assets, sensors, and computing devices for managing the operation of the asset transporter (130). The asset transporter (130) may be implemented using different components without departing from the invention.

The asset transporter (130) may provide asset transportation services. Asset transportation services may include (i) obtaining asset transportation requests and (ii) transporting assets between different locations to service the asset transportation requests. The asset transportation requests may be obtained from, for example, the deployment manager (120) and/or other entities. When servicing the asset transportation requests, the asset transporter (130) may transport one or more of the assets between an active area and a management area.

In one or more embodiments of the invention, assets that are operating as part of the deployment (100) may be disposed in the active area. For example, assets that are operating in an active mode may be disposed in the management area. Assets that switch from the active mode to the management mode may be transported to the management area.

In one or more embodiments of the invention, assets that are not operating as part of the deployment (100) may be disposed in the management area. For example, assets that are operating in a management mode may be disposed in the management area. Assets that switch from the management mode to the active mode may be transported to the active area.

To facilitate movement of the asset transporter (130) between the active and management areas, the asset transporter (130) may utilize a deployment topology map. The deployment topology may include a description of the location of the assets (102), the active area, the management area, and/or other information that facilitate transportation of the assets (102). The asset transporter (130) may obtain the deployment topology map from any source (e.g., the deployment manager (120). For additional details regarding deployment topology maps, refer to FIG. 3.

The networks (110) may be implemented as any type and quantity of physical networks that support wired and/or wireless communications. The networks (110) may support any number and/or combination of communication protocols. Each of the networks (e.g., 112, 114) may support similar and/or different numbers and types of communication protocols.

In one or more embodiments, the networks (110) include an active network and a management network. The active network may be used to facilitate communications between assets of the deployment (100) operating in an active mode and/or other devices. The management network may support communications between assets of the deployment operating in a management mode and/or other assets. In one or more embodiments of the invention, the active network is segregated from the management network.

In one or more embodiments of the invention, one or more of the networks (110) only services assets within a predetermined area. For example, the one or more of the networks (110) may only provide networking services to assets disposed in an active area and at least one other network of the networks may only provide networking services to assets disposed in a management area. Consequently, transporting an asset between the aforementioned areas may automatically transition the asset between the networks (e.g., disconnect from a first network and connect to a second network when transported between areas).

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, the assets of the deployment of FIG. 1.1 may be arranged into groups when disposed in structural components. Such groups may be referred to as asset collections. FIG. 2.1 shows a diagram of an example asset collection (200) in accordance with one or more embodiments of the invention. As discussed above, an asset collection may be a physical arrangement of assets (e.g., 202).

To arrange the assets of the example asset collection (200) with respect to each other, the example asset collection (200) may include a structural element such as, for example, an asset storage (210). An asset storage (210) may be a physical structure adapted to position and/or orient multiple assets within a predetermined space. For example, the asset storage (210) maybe implemented as a rack mount structure adapted to receive the chassis of the assets. When the assets are received by the asset storage (210), the assets (e.g., 202) may be reversibly locked in place with respect to each other.

For example, as illustrated in FIG. 2.1, the asset storage (210) may enable the assets (e.g., 202) to be vertically stacked with respect to the other assets (202). By doing so, the assets (e.g., 202) may be packed tightly with respect to each other and/or positioned and/or oriented in a predetermined with respect to each other. For example, as seen in FIG. 2.1, the assets may be stacked with respect to each other and orient a predetermined face of each of the assets (202).

The oriented predetermined face of each asset may include, for example, one or more automated locks (204). The automated locks (204) may physical devices that restrict access to portions of the assets. For example, the automated locks (204) may control whether portions of a chassis (e.g., a structural component) of an asset may be opened to enable physical access to hardware components (e.g., processors, memory modules, etc.) of the assets.

The automated locks (204) may be remotely operated by a deployment manager or other device. For example, the automated locks (204) may be operably connected to the deployment manager via a network over which commands to lock or unlock are obtained. Consequently, physical access to the hardware components of the assets (202) granularly controlled.

While the automated locks (204) have been illustrated and described as limiting access to assets on an asset level, automated locks (204) may be utilized to provide more granular physical access restrictions without departing from the invention. For example, chassis may include multiple automated locks (204) that enable physical access to different groups of hardware components without departing from the invention. For example, a first automated lock may restrict access to data processing components (e.g., processors, memory modules, etc.), a second automated lock may restrict access to auxiliary components (e.g., power supplies, cooling fans, etc.), a third automated lock may restrict access to input/output devices (e.g., universal serial bus ports, mouse ports, network connectivity ports, etc.), and a fourth automated lock may restrict access to control buttons (e.g., power, reset, etc.). An asset may include any number of automated locks (204) without departing from the invention.

While described as being remotely operably, the automated locks may be operable via local devices (e.g., hardware components of the asset, a computing device proximate to the assets that wirelessly connects to the automated locks (204), etc.) without departing from the invention.

While the example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.1 without departing from the invention.

In one or more embodiments of the invention, asset storages may provide asset-level access control. Asset-level access control may include (i) restricting physical access to assets, (ii) managing power distribution to assets, and/or (iii) managing network connectivity to assets. Turning to FIG. 2.2, FIG. 2.2 shows a diagram of the example asset collection (200) in accordance with one or more embodiments of the invention that includes an asset storage (210) may be used to provide asset-level access control.

To provide asset-level access control, the asset storage (210) may include automated locks (212) and an asset storage manager (220). Each of these components are discussed below.

The like the automated locks discussed with respect to FIG. 1.1, the automated locks (212) may be physical, remotely operable devices that selectively restrict access to assets. However, the automated locks (e.g., 212) illustrated in FIG. 2.2 may be integrated into the asset storage (210) rather than the chassis of the assets. For example, the automated locks may selectively lock/unlock doors or other physical structures that form a portion of the asset storage (210). Selectively unlocking one of the doors may enable physical access to an asset.

While illustrated as providing highly granular access (e.g., an automated lock per asset), the automated locks may be implemented on a more macro-level (e.g., an automated lock per 2 assets, per 4 assets, per asset storage, etc.) without departing from the invention. Additionally, a system in accordance with embodiments of the invention may use automated locks on both the asset storage and the chassis of the assets without departing from the invention.

The asset storage manager (220) may be a physical device that provides access control services for the assets (not shown in FIG. 2.2, hidden behind the portions of the asset storage (210) that restrict physical access to them). To provide access control services, the asset storage manager (220) may including (i) a power distribution system and (ii) a network connectivity control system.

The power distribution system may control the distribution of power to each of the assets. For example, the power distribution system may include (i) a power supply, (ii) a power backup system (e.g., an onboard battery), and (iii) a power manager. The power supply may obtain and condition power for distribution to the assets. The power backup system may ensure that power is available to the power supply when other sources of power are unavailable (e.g., when not plugged into a wall source).

The power manager may selectively control when power is provided to the assets. The power manager may selectively control when power is provided to the assets at a granular level (e.g., on a per asset level) and based on messages obtained from other entities (e.g., from a deployment manager). Consequently, the deployment manager or other entities may be capable of restricting power to any of the assets by sending appropriate messages to the asset storage manager.

The network connectivity control system may control the connectivity between the assets and other devices. For example, the network connectivity control system may control to which network each of the assets are connected. To do so, the network connectivity control system may include one or more networking devices that enable the network connectivity control system to operably connect to one or more networks. The network connectivity control system may be operably connected to one or more of the assets and may selectively provide access to the network to which the network connectivity control system is connected to the respective assets.

The network connectivity control system may selectively connect the assets to networks based on messages obtained from other entities (e.g., from a deployment manager). Consequently, the deployment manager or other entities may be capable of controlling network connectivity between the assets and any number of networks by sending appropriate messages to the asset storage manager.

The network connectivity system may selectively connect the assets to networks via other methods without departing from the invention. For example, the network connectivity system may connect the assets to networks based on network availability (e.g., provide connectivity based on whatever networks to which the network connectivity system is able to connect). By doing so, geographically restricted networking may automatically cause the network connectivity provided to the assets to change as the example asset collection (200) is moved between different geographic regions in which different types of networks are available.

The asset manager (220) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset manager (220) described in this application and/or all, or a portion, of the methods illustrated in FIGS. 4.1-4.4. The asset manager (220) may be implemented using other types of computing devices without departing from the invention. For additional details regarding computing devices, refer to FIG. 6.

An example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.2 without departing from the invention.

Figure 3:
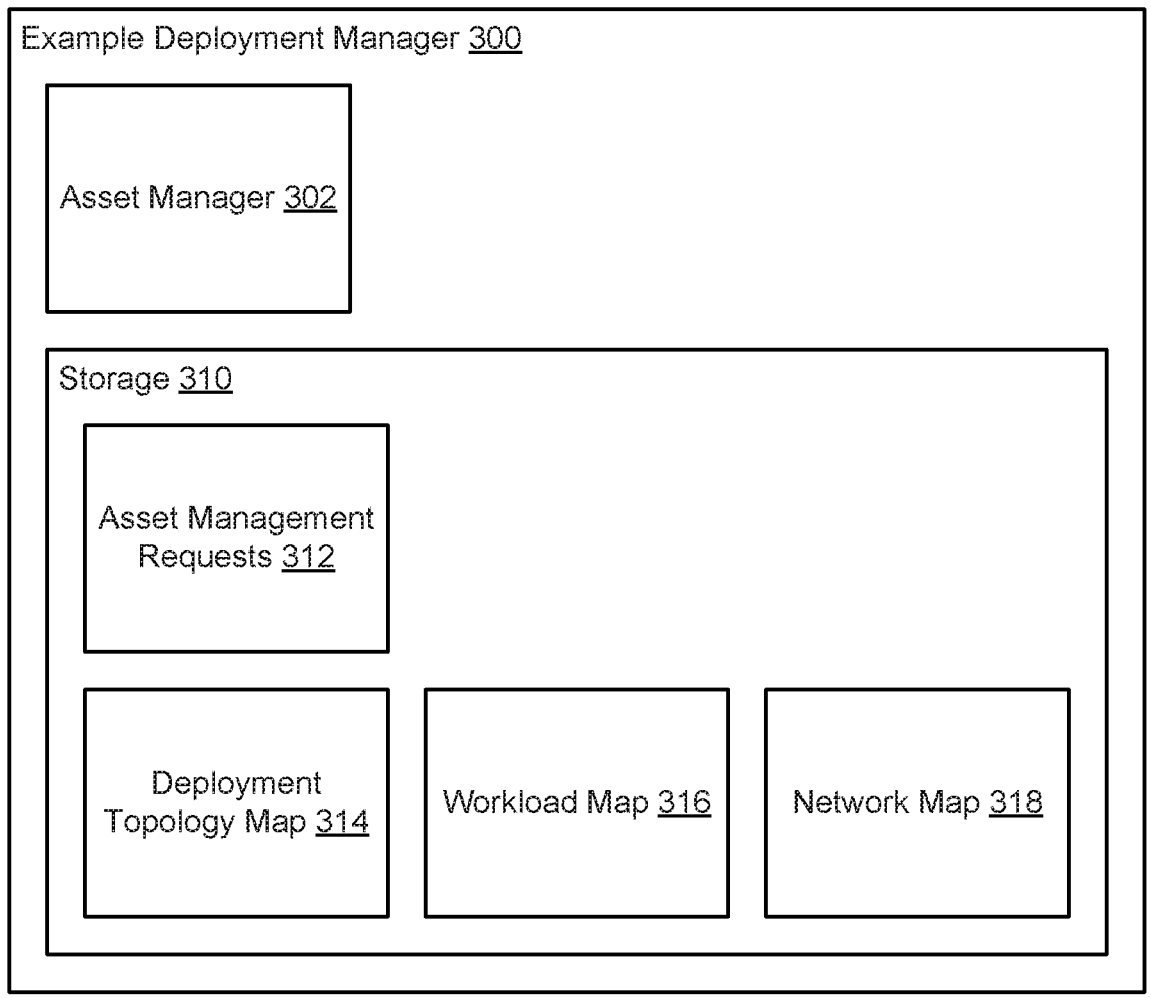
FIG. 3 shows a diagram of a deployment manager in accordance with one or more embodiments of the invention.

As discussed above, the deployment manager (120) of FIG. 1 may provide deployment management services. FIG. 3 shows a diagram of an example deployment manager (300) in accordance with one or more embodiments of the invention.

The example deployment manager (300) may provide deployment management services for one or more deployments. To provide the aforementioned functionality, the example deployment manager (300) may include an asset manager (302) and storage (310). Each of these components of the example deployment manager (300) is discussed below.

The asset manager (302) may be implemented using physical and/or logical devices. For example, the asset manager (302) may be implemented using computer readable instructions (e.g., program code) that when executed by the computing resources of the asset manager (302) give rise to the functionality of the asset manager (302). In another example, the asset manager (302) may be implemented using special purpose hardware devices such as, for example, programmable gate arrays, application specific integrated circuit, or another type of hardware device that provides the functionality of the asset manager (302) by including circuitry adapted to provide the aforementioned functionality. In a still further example, the asset manager (302) may be implemented using a combination of computer readable instructions (e.g., program code) and special purpose hardware devices.

The asset manager (302) may provide asset management services. Asset management services may include servicing asset management requests. An asset management request may be a request to modify one or more characteristics of an asset. The characteristics of an asset include (i) a software component hosted by the asset, (ii) a hardware component of the asset, and/or (iii) a configuration of a hardware component or a software component of the asset. A characteristic of the asset may relate to other physical or logical components of an asset without departing from the invention.

The asset management requests may be obtained from, for example, an information technology ticketing system. An information technology ticketing system may be a system used to manage the process of modifying computing devices. For example, when a problem with a computing device is ascertained, a ticket may be added to the information technology ticketing system. In another example, when a new asset is obtained and to be added to the deployment, a ticket may be added to the information technology ticketing system. The ticket may include information regarding the problem and information regarding the computing device. Consequently, the ticket may be used to ascertain which assets of a deployment may need to be managed by the deployment manager. The asset management requests may be tickets, as discussed above, or may be other types of data structures that include information regarding assets that need to be managed by the deployment management system. Asset management requests may be obtained via other methods (e.g., administrators may generate and provide the asset management requests rather than using a ticketing system) without departing from the invention.

To service asset management requests, the asset manager (302) may perform all, or a portion, of the methods illustrated in FIGS. 4.1-4.4. By doing so, a system in accordance with embodiments of the invention may reduce the risk of servicing assets by (i) limiting physical access to components of the assets when not being managed, (ii) segregating assets from a network utilized by a deployment during servicing, (iii) ensuring that workloads being performed by assets that are going to be serviced continue to be performed, and/or (iv) remove the asset from the area in which active assets of the deployment are located for servicing purposes and return the asset to the area after being serviced.

When providing deployment management services, data structures stored in the storage (310) may be utilized. In one or more embodiments of the invention, the storage (310) includes devices that provide data storage services (e.g., storing data and providing copies of previously stored data). The devices that provide data storage services may include hardware devices and/or logical devices. For example, the storage (310) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (310) may include a memory device (e.g., a dual in line memory device) in which data is stored and from which copies of previously stored data are provided. In another example, the storage (310) may include a persistent storage device (e.g., a solid-state disk drive) in which data is stored and from which copies of previously stored data is provided. In a still further example, the storage (310) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (310) may store data structures asset management requests (312), a deployment topology map (314), a workload map (316), and/or a network map (318). Each of these data structures is discussed below.

The asset management requests (312) may be a data structure that includes information regarding any number of requests for managing assets (discussed above) that have been obtained by the example deployment manager (300). For example, when an asset management request is obtained, it or information regarding it may be stored as part of the asset management requests (312).

The deployment topology map (314) may be a data structure that includes information regarding the topology of a deployment for which the example deployment manager (300) provides deployment management services. The deployment topology map (314) may include information regarding (i) the locations of the assets of the deployment, (ii) size, shape, and/or other geometric information regarding the assets and/or structures in which the assets are housed, (iii) the location and geometric information (e.g., size, boundaries, travel paths, locations of structures, etc.) of an active area associated with the deployment, (iv) the location and geometric information (e.g., size, boundaries, travel paths, locations of structures, etc.) of a management area, (v) the locations of where the assets of the deployment are to be disposed when in active mode, and/or (vi) other information that may be used to facilitate transportation and/or identification of assets of the deployment.

The storage (310) may include any number of deployment topology maps corresponding to any number of deployments.

The workload map (316) may be a data structure that includes information regarding the workloads being performed by the assets of a deployment for which the example deployment manager (300) provides deployment management services. The workload map (316) may include information regarding (i) the number and (ii) type of workloads being performed by each of the assets. The workload map (316) may also include information regarding assets to which workloads being performed by the assets may be migrated.

The network map (318) may be a data structure that includes information regarding the networks to which assets of a deployment may operably connected and/or the asset storage managers that control network connectivity for assets of the deployment. The network map (318) may include information including (i) the network each asset is operably connected to, (ii) a type of each network (e.g., active, management, etc.), (iii) the assets for each asset storage manager provides network connectivity, and/or (iv) other types of information regarding the network environment in which the assets reside.

While the storage (310) has been illustrated as including data structures that include a limited amount of specific information, any of the data structures stored in the storage (310) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the example deployment manager (300) is illustrated in FIG. 3 as including a limited number of specific components, a deployment manager in accordance with embodiments of the invention may include additional, fewer, and/or different components from those illustrated in FIG. 3 and/or discussed above without departing from the invention.

As discussed above, the system of FIG. 1 may provide deployment management services. FIGS. 4.1-4.4 show methods that may be performed by components of the system of FIG. 1 to provide deployment management services.

FIG. 4.1 shows a flowchart of a method in accordance with one or more embodiments of the invention. The method depicted in FIG. 4.1 may be used to service an asset management request in accordance with one or more embodiments of the invention. The method shown in FIG. 4.1 may be performed by, for example, a deployment manager (e.g., 120, FIG. 1). Other components of the system in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, an asset management request for an asset is obtained.

The asset management request may be obtained, for example, from a ticketing system, via a message from another entity, as part of stored asset management requests, or another source. The asset management request may indicate that at least one characteristic of an asset is to be modified.

In one or more embodiments of the invention, the modification is for a hardware component of an asset. For example, the modification may be a replacement, a change in configuration, or another type of change that requires physical access to the hardware component for the change to be implemented.

In step 402, the location of the asset is identified. The location of the asset may be identified based on (i) a deployment topology map and/or (ii) information obtained from the asset. For example, the asset may be queried for its location. The asset may obtain its location using (i) a global positioning system receiver and/or (ii) other types of sensors. For example, the asset may include distance finding sensors, position finding sensors, orientation finding sensors, and/or any other types of sensor necessary for the asset to identify its location. The sensors may operate using, for example, optical light, radio frequency electromagnetic radiation, acoustic waves, etc.

The information obtained from the asset may be used separately or in conjunction with the deployment topology map to ascertain the location of the asset.

In step 404, it is determined whether the location is unexpected. The determination may be made by comparing the location identified in step 402 to a location for the asset specified by the deployment topology map. If there is a different between the identified location and the specified location, the location may be determined to be unexpected. If there is no difference between the identified location and the specified location, the location may be determined to be expected.

If the location is determined to be unexpected, the method may proceed to step 406. If the location is determined as not being unexpected (i.e., expected), the method may proceed to step 412.

In step 406, the asset is placed into management mode. In management mode, the impact on the operation of the deployment by the asset may be reduced, as discussed above. Additionally, when placed in management mode the asset may be made serviceable. In other words, physical access to hardware components of the asset may be made available.

The asset may be placed into management mode via the method illustrated in FIG. 4.2. The asset may be placed into management mode via other methods without departing from the invention.

In step 408, the asset is managed based on the asset management request. The asset may be managed based on the asset management request by leaving the asset in management mode until a change in one or more characteristics of the asset specified by the asset management request are identified as being completed.

For example, when an asset enters management mode, the asset may be transported to an area in which hardware components of the asset may be modified by a technician, administrator, automated system (e.g., a robot), or another entity. When the hardware components have been modified, the asset may report via a message that its hardware components have been modified.

In response to the notification, the deployment manager may identify that the modifications of the one or more characteristics of the asset specified by the asset management request have been completed. Additionally, the deployment manager may notify other entities (e.g., a ticketing system) that the modifications are complete.

In step 410, the asset is placed into active mode. In active mode, the asset beings to operate as part of the deployment. Consequently, the operation of the asset begins to impact the operation of the deployment. Additionally, when placed in active mode the asset may be made unserviceable by, for example, preventing physical access to its hardware components.

The asset may be placed into active mode via the method illustrated in FIG. 4.3. The asset may be placed into active mode via other methods without departing from the invention.

The method may end following step 410.

Returning to step 404, the method may proceed to step 412 following step 410 when it is determined that the location of the asset is unexpected.

In step 412, the location of the asset is remediated. Remediating the location of the asset may cause the location of the asset to become expected.

The location of the asset may be remediated by: (i) notifying a technician of the location of the asset, (ii) transporting the asset from the unexpected location to another location (e.g., the expected location, a management area, etc.), and/or (iii) updating a deployment topology map based on the unexpected location (e.g., to reflect the unexpected location so that it becomes expected).

The method may proceed to step 406 following step 412.

Using the method illustrated in FIG. 4.1, a system in accordance with one or more embodiments of the invention may manage assets of a deployment in a manner that (i) reduces the likelihood that servicing assets will impact the operation of the deployment, (ii) improve the security of the deployment by preventing assets from being modified without appropriate records and authorizations of the modifications being documented, and/or (iii) reduces the likelihood of improper modifications by technicians who may confuse one asset that is to be modified with another asset that is not to be modified.

As discussed with respect to FIG. 4.1, an asset may be temporarily placed into a management mode when management services are provided to a deployment. FIGS. 4.2 and 4.3 shows methods that may be used to place an asset into a management and an active mode, respectively.

FIG. 4.2 shows a flowchart of a method in accordance with one or more embodiments of the invention. The method depicted in FIG. 4.2 may be used to place an asset into a management mode of operation in accordance with one or more embodiments of the invention. The method shown in FIG. 4.2 may be performed by, for example, a deployment manager (e.g., 120, FIG. 1). Other components of the system in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, a workload hosted by the asset is migrated to a second asset. The workload may be migrated by instantiating a copy of the workload in the second asset. The workload may be suspended in the asset as part of the migration.

In one or more embodiments of the invention, the second asset is identified using a workload map. For example, the workload map may be used to identify any number of assets that are capable of performing the copy of the workload. One of the any number of assets may be selected as the second asset to which the workload is migrated.

In one or more embodiments of the invention, the workload hosted by the asset is identified using the workload map. As discussed above, the workload map may include information regarding each of the workloads hosted by the assets of the deployment. The type of workloads hosted by the asset may be compared to the types of modifications that will be made to the asset to ascertain whether any of the workloads would be impaired by performance of the modifications. The workload may be one of the identified workloads that will be impaired by the performance of the modifications.

The workload may be migrated to the second asset by sending appropriate messages to the asset and the second asset. For example, a message indicating that a copy of the workload is to be instantiated in the second asset may be sent to the second asset or another entity (e.g., an entity that manages the workloads being performed by the second asset). In response, the second asset or the another entity may cause the second asset to instantiate a copy of the workload.

Instantiating a copy of the workload may include, for example, storing data in the second asset, allocating computing resources of the second asset for performance of the workload, initiating execution of program code that causes the workload to be performed, etc.

Workloads hosted by other assets of the asset collection of which the asset is a members may also be migrated. As will be discussed with respect to step 436, multiple other assets may be transported to facilitate transport of the asset to the management area. Consequently, other workloads hosted by the other assets may also be impacted due to changes in connectivity between the other assets and the active network utilized by the deployment, as will be discussed with respect to step 422.

In step 422, the asset is transitioned from an active network to a management network.

In one or more embodiments of the invention, the asset is transitioned from the active network to the management network by sending a message indicating that the asset is to disconnect from the active network and is to connect to the management network. In response to the message, the asset may operably connect to the management network and disconnect from the active network.

In one or more embodiments of the invention, the asset is transitioned from the active network to the management network by sending a message to an asset storage manager (e.g., 220, FIG. 2.2) of an asset storage (e.g., 210, FIG. 2.2) in which the asset is disposed or another entity (e.g., an entity that manages the asset storage manager of the asset storage in which the asset is disposed) indicating that the asset is to be disconnected from the active network and is to be connected to the management network. In response to the message, the asset storage manager may operably connect the asset to the management network and disconnect the asset from the active network.

In one or more embodiments of the invention, other assets of the asset collection of which the asset is a member may also be transitioned from the active network to the management network. For example, the active network may not be available in the management area. Consequently, it may be helpful to transition the other assets to the management network to maintain connectivity between the other assets and other entities (e.g., the deployment manager).

The asset and/or other assets may be transitioned from the active network to the management network by being transported to the management area (e.g., step 426). Such a transition may occur due to geofencing or other network features that automatically restrict and enable network access based on location.

In step 424, physical access to the asset is enabled.

In one or more embodiments of the invention, physical access to the asset is enabled by sending a message to an automated lock of the asset or another entity (e.g., an entity that manages the automated lock such as the asset itself) indicating that the automated lock is to be unlocked. In response to the message, the automated lock may unlock thereby enabling physical access to all, or a portion, of the asset.

In one or more embodiments of the invention, physical access to the asset is enabled by sending a message to an automated lock of an asset storage in which the asset is disposed or another entity (e.g., an entity that manages the automated lock such as an asset storage manager) indicating that the automated lock is to be unlocked. In response to the message, the automated lock may unlock thereby enabling physical access to all, or a portion, of the asset.

Physical access to other assets of the asset collection of which the asset is a member may not be enabled. For example, physical access to the other assets may be actively prevented by verifying that locks or other types of physical access controls are operating in a manner to prevent physical access to the other assets of the asset collection of which the asset is a member.

In step 426, the asset is transported to a management area.

In one or more embodiments of the invention, the asset is transported to the management area by sending a message to an asset transporter (e.g., 130, FIG. 1). The message may request that the asset be transported from its current location to the management area. In response to the message, the asset transporter may transport the asset from its current location to a management area.

The asset may be transported to the management area by transporting the entire asset collection (or a portion thereof) to the management area. For example, if implemented as a rack mount chassis, the entire rack mount chassis including any number of other assets may be transported to a management area.

During step 426, onboard power supplies or asset-collection level power sources (e.g., batteries) may ensure that the assets and/or other assets of an asset collection of which the asset is a member provide power to the assets until another source of power is available.

The deployment topology map (e.g., 314, FIG. 3) may be updated based on the transportation of the asset to the management area. For example, an entry corresponding to the asset may be updated to specify the new location of the asset of it is transported to the management area.

The method may end following step 426.

Using the method illustrated in FIG. 4.2, an asset may be placed into a management mode. Consequently, the impact on the deployment for servicing the asset may be reduced by separating the asset from the deployment.

FIG. 4.3 shows a flowchart of a method in accordance with one or more embodiments of the invention. The method depicted in FIG. 4.3 may be used to place an asset into an active mode of operation in accordance with one or more embodiments of the invention. The method shown in FIG. 4.3 may be performed by, for example, a deployment manager (e.g., 120, FIG. 1). Other components of the system in FIG. 1 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 430, a workload, that was hosted by the asset prior to entering management mode, is migrated from a second asset to the asset.

The workload may be migrated by instantiating a copy of the workload in the asset. Any existing copies (e.g., execution suspended workload) of the workload may be terminated prior to instantiating the copy of the workload.

The workload may be migrated by updating an existing copy of the workload in the asset based on the workload in the second asset and beginning execution of the copy of the workload.

The workload may be migrated by beginning execution of a copy of the workload (e.g., execution suspended workload). In other words, beginning execution of an instance of the workload that was previously suspended from execution due to entering management mode.

In one or more embodiments of the invention, the asset is identified using a workload map. For example, the workload map may be used to identify that the workload had been previously migrated from the asset to the second asset.

In one or more embodiments of the invention, the workload hosted by the asset is identified using the workload map. As discussed above, the workload map may include information regarding each of the workloads hosted by the assets of the deployment. The workload map may include a history of workloads performed by the asset prior to entering management mode and where those workloads had been migrated. The workload map may be updated based on this migration.

The workload may be migrated to the asset by sending appropriate messages to the asset and the second asset. For example, a message indicating that a copy of the workload is to be instantiated in the asset may be sent to the asset or another entity (e.g., an entity that manages the workloads being performed by the asset). In response, the asset or the another entity may cause the asset to instantiate a copy of the workload.

Instantiating a copy of the workload may include, for example, storing data in the asset, allocating computing resources of the asset for performance of the workload, initiating execution of program code that causes the workload to be performed, etc.

Workloads hosted by other assets of the asset collection of which the asset is a member may also be migrated to reverse the migrations performed in step 420 of FIG. 4.2.

In step 432, the asset is transitioned from a management network to an active network.

In one or more embodiments of the invention, the asset is transitioned from the management network to the active network by sending a message to the asset indicating that the asset is to disconnect from the active network and is to connect to the management network. In response to the message, the asset may operably connect to the management network and disconnect from the active network.

In one or more embodiments of the invention, the asset is transitioned from the active network to the management network by sending a message (e.g., a transition message) to an asset storage manager (e.g., 220, FIG. 2.2) of an asset storage (e.g., 210, FIG. 2.2) in which the asset is disposed or another entity (e.g., an entity that manages the asset storage manager of the asset storage in which the asset is disposed) indicating that the asset is to be disconnected from the active network and is to be connected to the management network. In response to the message, the asset storage manager may operably connect the asset to the management network and disconnect the asset from the active network.

In one or more embodiments of the invention, other assets of the asset collection of which the asset is a member may also be transitioned from the management network to the active network. For example, the active network may be available in the active area. Consequently, it may be helpful to transition the other assets to the active network to enable connectivity between the other assets of the deployment.

The asset and/or other assets may be transitioned from the management network to the active network by being transported to the active area (e.g., step 436). Such a transition may occur due to geofencing or other network features that automatically restrict and enable network access based on location.

In step 434, physical access to the asset is disabled.

In one or more embodiments of the invention, physical access to the asset is disabled by sending a message to an automated lock of the asset or another entity (e.g., an entity that manages the automated lock such as the asset itself) indicating that the automated lock is to be locked. In response to the message, the automated lock may lock thereby disabling physical access to all, or a portion, of the asset.

In one or more embodiments of the invention, physical access to the asset is disabled by sending a message to an automated lock of an asset storage in which the asset is disposed or another entity (e.g., an entity that manages the automated lock such as an asset storage manager) indicating that the automated lock is to be locked. In response to the message, the automated lock may lock thereby disabling physical access to all, or a portion, of the asset.

Physical access to other assets of the asset collection of which the asset is a member may not be enabled. For example, physical access to the other assets may be actively prevented by verifying that locks or other types of physical access controls are operating in a manner to prevent physical access to the other assets of the asset collection of which the asset is a member.

In step 436, the asset is transported to an active area.

In one or more embodiments of the invention, the asset is transported to the active area by sending a message to an asset transporter (e.g., 130, FIG. 1). The message may request that the asset be transported from its current location (e.g., a management area) to the active area. In response to the message, the asset transporter may transport the asset from its current location to the active area.

The asset may be transported to the active area by transporting the entire asset collection (or a portion thereof) to the active area. For example, if implemented as a rack mount chassis, the entire rack mount chassis including any number of other assets may be transported to the active area.

During step 436, onboard power supplies or asset-collection level power sources (e.g., batteries) may ensure that the assets and/or other assets of an asset collection of which the asset is a member provide power to the assets until another source of power is available.

The deployment topology map (e.g., 314, FIG. 3) may be updated based on the transportation of the asset to the active area. For example, an entry corresponding to the asset may be updated to specify the new location of the asset of it is transported to the management area.

The method may end following step 436.

Using the method illustrated in FIG. 4.3, an asset may be placed into an active mode. Consequently, asset may rejoin (e.g., begin to impact the other assets of the deployment by virtue of network connectivity, performance of workloads, etc.) the deployment and begin to contribute to the functionality of the deployment.

As noted above, a deployment manager may provide management services when new assets are added to a deployment. FIG. 4.4 shows a flowchart of a method in accordance with one or more embodiments of the invention. The method depicted in FIG. 4.4 may be used to new asset management services in accordance with one or more embodiments of the invention. The method shown in FIG. 4.4 may be performed by, for example, a deployment manager (e.g., 120, FIG. 1). Other components of the system in FIG. 1 may perform all, or a portion, of the method of FIG. 4.4 without departing from the invention.

While FIG. 4.4 is illustrated as a series of steps, any of the steps may be omitted, performed in a different order, additional steps may be included, and/or any or all of the steps may be performed in a parallel and/or partially overlapping manner without departing from the invention.

In step 440, a new asset to be added to a deployment is identified.

The identification may occur based on a network topology map. When the new asset is to be added to the deployment, it may come online and thereby provide its information (e.g., identity, physical location, etc.) to a management entity (not shown) that updates the deployment topology map. In response to being provided the aforementioned information, the management entity may update the deployment topology map to reflect the new asset.

The new asset may be identified via other methods without departing from the invention. For example, an administrator or person may provide appropriate information regarding the new asset rather than via an automated method.

In step 442, the asset is placed into management mode. The asset may be placed into management mode via the method illustrated in FIG. 4.2. The asset may be placed into management mode via other methods without departing from the invention.

In step 444, the asset is managed for addition to the deployment. The asset may be managed for addition to the deployment by leaving the asset in management mode until a change in one or more characteristics of the asset are identified as being completed. The change in characteristics may correspond to those necessary to place the asset into condition to operate as part of the deployment. Such changes may include, for example, addition of hardware components, software components, and/or changes in configuration of components of the asset.

In step 446, the asset is placed into active mode. The asset may be placed into active mode via the method illustrated in FIG. 4.3. The asset may be placed into active mode via other methods without departing from the invention.

The method may end following step 446.

Using the method of FIG. 4.4, a system may facilitate the addition of assets to a deployment in a manner that reduces the risk of impacting the operation of the deployment while the asset is prepared for addition to the deployment.

To further clarify embodiments of the invention, a non-limiting example is provided in FIGS. 5.1-5.3. FIG. 5.1 shows a system similar to that illustrated in FIG. 1. FIGS. 5.2-5.3 illustrate interactions between components and/or actions performed by the components of the system of FIG. 5.1 over time.

For the sake of brevity, only a limited number of components of the system of FIG. 1 are illustrated in each of FIGS. 5.1-5.3.

Example

Consider a scenario as illustrated in FIG. 5.1. FIG. 5.1 shows a top down view of a deployment (500) is disposed in a structure that includes an active area in which the assets (510) are disposed while operating as part of the deployment. The structure also includes a management area (504), illustrated as a room within the structure. For simplicity, openings from the management area (504) into the active area (502) are not illustrated.

To facilitate management of the deployment (500), a deployment manager (522) is disposed in the structure. The deployment manager (522) is operably connected to the assets (510) and an asset transporter (524) via networks (520). The networks (520) include an active network and a management network.

At a first point in time, an asset fails. The failed asset (512) is a part of an asset collection (illustrated as the box filled with dots) that is disposed in the active area (502). When failed, the failed asset (512) is able to continue to function but at a greatly reduced ability to perform workloads. A second asset (514) that is part of a second asset collection is also disposed in the active area. The second asset (514) includes sufficient computing resources and other characteristics to perform the database workload being performed by the failed asset (512).

At the first point in time, the failed asset (512) is automatically identified by another management system (not shown) as having failed. The management system generates a ticket indicating that the failed asset (512) needs to be serviced.

Turning to FIGS. 5.2-5.3, the aforementioned figures illustrate interactions and actions between components of the system of FIG. 5.1. In these figures, the relative occurrence in time of the interactions progresses from the top of each figure (i.e., earlier in time) to the bottom of each figure (i.e., later in time). FIG. 5.3 is a continuation of the diagram of FIG. 5.2. In other words, element 550 indicates the first interaction that occurs in time while element 580 indicates the last interaction that occurs.

Turning to FIG. 5.2, the deployment manager (522) obtains a management request for the failed asset (550) based on the ticket added to the management system. The management request was sent to the deployment manager (522) by the management system and indicates that the failed asset (512) needs to be serviced.

In response to obtaining the management request, the deployment manager (522) takes action to cause the failed asset (512) to be serviced to satisfy the management request. The deployment manager (522) first sends a management mode request (552) to the failed asset (512) that indicates that (i) the database workload being performed is to be transferred to the second asset (512), (ii) the failed asset (512) is to disconnect from the active network and join the management network, and (iii) unlock the front bezel of the chassis of the asset.

In response to receiving the management mode request (552), the failed asset (512) sends the database workload (554) to the second asset (512) which begins to perform the database workload upon receiving the database workload. Consequently, the database workload, that contributes to the functionality of the deployment, continues to be performed while the failed asset (512) begins to no longer operate as part of the deployment while being serviced.

The failed asset (512) then disconnects from the active network, thereby segregating the network connectivity of the failed asset (512) away from the other assets of the network (including the second asset), and joins the management network (556). By doing so, connectivity between the failed asset (512) and other entities is maintained while preventing network connectivity between the failed asset and the deployment from impacting the operation of the deployment while the asset is being serviced.

The failed asset (512) next unlocks its bezel (558). By unlocking its bezel, physical access to the component of the failed asset (558) that needs to be replaced is enabled.

The deployment manager (552) also sends a transport request for the asset (560) to the asset transporter (524). The transport request indicates that the failed asset (512) is to be transported from the active area to the management area, discussed with respect to FIG. 5.1.

In response to receiving the transport request, the asset transporter (524) uses a deployment topology map to identify that the failed asset (512) is a part of an asset collection (illustrated as the box with dots in FIG. 5.1) of the deployment. The asset transporter (524) identifies (i) the location of the asset collection within the active area using the deployment topology map and (ii) a route to the management area.

Using the location of the asset and the route, the asset transporter (524) moves the failed asset (512) to the management area (562). While actions 554-562 are illustrated in FIG. 5.2 as being performed sequentially in time, any of these actions may be performed in (i) a different order and/or (ii) a parallel or partially overlapping in time manner.

Once the failed asset (512) is transported to the management area, a technician uses the unlocked bezel to access and replace the hardware component of the failed asset (512) that caused it to enter the failed state. Consequently, the failed asset (512) is no longer in a failed state because it is able to operate in a desired manner by virtue of having the hardware component replaced. In other words, the failed asset (512) has now become a serviced asset (516) that is able to operate in the desired manner.

Turning to FIG. 5.3, the deployment manager (522) identifies that the failed asset is a serviced asset (516) ready to be returned to active operation as part of the deployment. In response to the identification, the deployment manager (522) sends a transportation request for the asset (570) to the asset transporter (524). The transport request indicates that the serviced asset (516) is to be transported from the management area to the active area, discussed with respect to FIG. 5.1.

In response to receiving the transport request, the asset transporter (524) uses a deployment topology map to identify that the (i) location within the active area in which the asset collection (illustrated as the box with dots in FIG. 5.1) is to be disposed and (ii) a route from the management area to the location within the active area.

Using the location and the route, the asset transporter (524) moves the serviced asset (516) to the location within the active area (i.e., the location where the asset collection is illustrated in FIG. 5.1).

The deployment manager (522) sends an active mode request (574) to the serviced asset (516) that indicates that (i) the database workload that was migrated to the second asset (512) is to be migrated to the serviced asset (516), (ii) the serviced asset (516) is to disconnect from the management network and join the active network, and (iii) lock the front bezel of the chassis of the serviced asset (516).

In response to receiving the active mode request (574), the serviced asset (516) obtains the database workload (576) from the second asset (512) and begins to perform the database workload.

The serviced asset (516) disconnects from the management network and joins the active network (578), thereby enabling network connectivity between the serviced asset (516) and other assets of the deployment.

The serviced asset (516) locks its bezel (580). By locking its bezel, physical access to the component of the serviced asset (580) is disabled. Consequently, nefarious, undesired, or modifications to the serviced asset (516) that are in error are prevented.

While actions 570-580 are illustrated in FIG. 5.3 as being performed sequentially in time, any of these actions may be performed in (i) a different order and/or (ii) a parallel or partially overlapping in time manner.

End of Example

Thus, as illustrated in FIGS. 5.1-5.3, embodiments of the invention may provide a method and system for managing a deployment that reduces the likelihood that the operation of the deployment will be impacted when assets of the deployment are serviced. For example, by selectively unlocking assets for servicing, errors in servicing the wrong assets may be prevent or reduced in occurrence rate.

Figure 6:
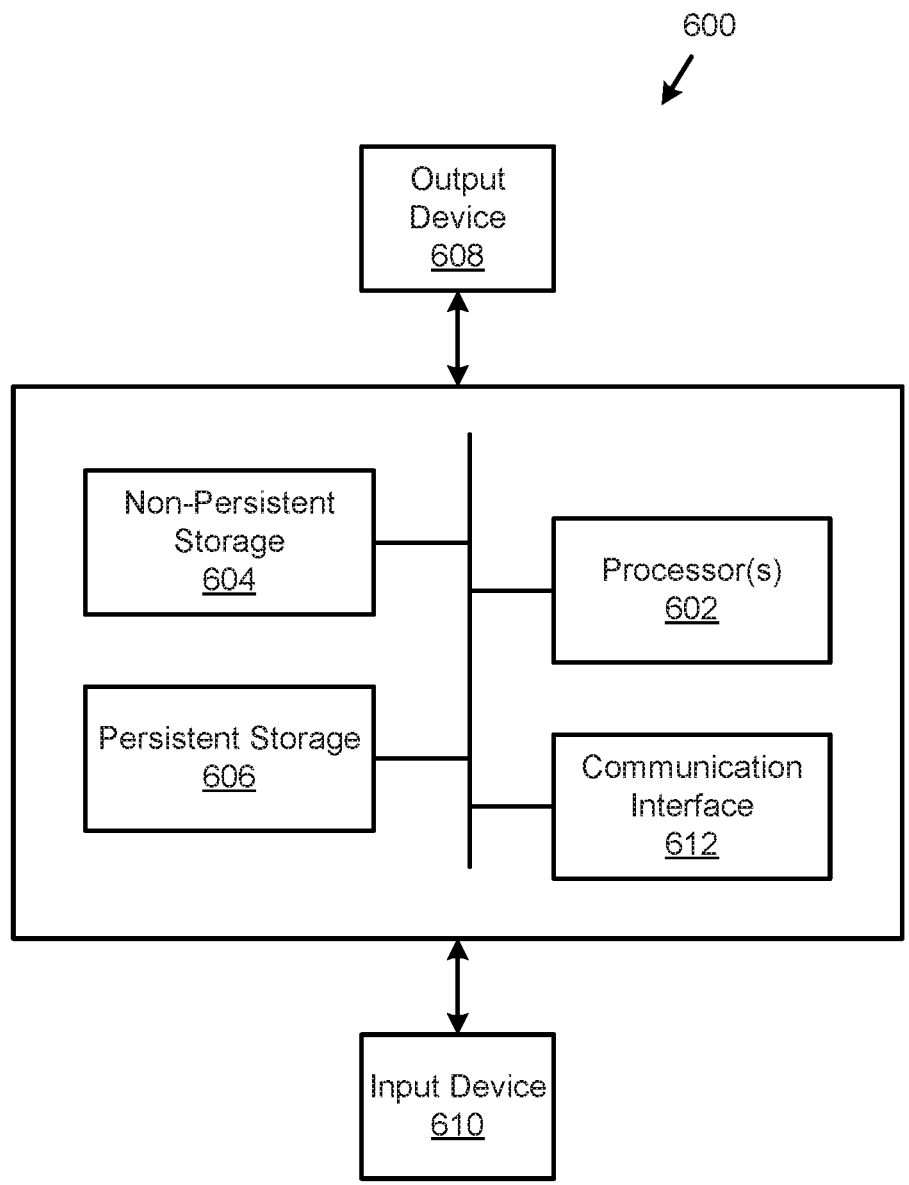
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method and system for managing a deployment. Specifically, embodiments of the invention may reduce the likelihood that servicing of assets of the deployment negatively impact the operation of the deployment. To do so, embodiments of the invention may provide systems and methods that automatically control physical access, network connectivity, physical locations, and/or workloads performed by assets for servicing. By doing so, one or more embodiments of the invention may provide a system that (i) reduces errors in servicing assets (e.g., servicing the wrong asset), (ii) reduces the cognitive burden on technicians and/or administrators (e.g., facilitates identification of assets that need to be serviced, automatically shifts workloads that if not shifted prior to servicing may negatively impact the operation of the deployment during servicing of assets), (iii) reduces the likelihood of malicious modifications of assets by prevent physical access to the assets (e.g., physically locking the assets while operating as part of the deployment and segregating assets that are operating as part of the deployment from those that are being serviced thereby reducing the physical area in which assets that may be physically accessed are available), and/or (iv) reducing the likelihood of disposing assets at improper locations (e.g., by automating removal and placement of assets in accordance with a deployment topology map).

Thus, embodiments of the invention may (i) provide a deployment that provides improved performance by reducing the likelihood that servicing of assets negatively impacts the operation of the deployment and (ii) reduce the cognitive burden on a person tasked with managing the deployment thereby improving the usability and/or serviceability of the deployment while also enabling the persons to manage larger and/or more complex deployments in a more time and/or energy efficient manner.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A deployment manager for managing a deployment, comprising:
   storage for storing an asset management request; and
   an asset manager programmed to:
      obtain the asset management request for an asset of the deployment;
      in response to obtaining the asset management request:
         place the asset into a management mode that enables at least one physical component of the asset to be physically managed,
         wherein placing the asset into the management mode that enables the at least one physical component of the asset to be physically managed comprises:
            wirelessly unlocking a structural component that prevents physical access to the asset, and
         wherein placing the asset into the management mode comprises:
            transitioning the asset from an active network to a management network, wherein the management network is segregated from the active network, and
            wherein the active network is adapted to service active assets of the deployment;
         manage the asset based on the asset management request while in the management mode; and
         place the asset into an active mode that disables the at least one physical component of the asset to be physically managed.

2. The deployment manager of claim 1, wherein the asset manager is further programmed to:
   prior to placing the asset into the management mode:
      identify a location of the asset;
      make a determination that the location of the asset is unexpected; and
      in response to the determination, remediate the location of the asset.

3. The deployment manager of claim 1, wherein placing the asset into the management mode that enables the at least one physical component of the asset to be physically managed comprises:
   migrating at least one workload hosted by the asset to a second asset.

4. The deployment manager of claim 1, wherein transitioning the asset from the active network to the management network comprises:
   disconnecting from the active network, and
   connecting to the management network.

5. The deployment manager of claim 1, wherein transitioning the asset from the active network to the management network comprises:
   sending a transition message for the asset to an asset storage manager, wherein the asset storage manager is a portion of an asset storage in which the asset is disposed.

6. The deployment manager of claim 1, wherein the structural component is a portion of a chassis of the asset.

7. The deployment manager of claim 1, wherein unlocking the structural component that prevents physical access to the asset comprises:
   sending an unlock message for the asset to an asset storage manager, wherein the asset storage manager is a portion of an asset storage in which the asset is disposed.

8. The deployment manager of claim 7, wherein the structural component is a portion of the asset storage.

9. The deployment manager of claim 1, wherein placing the asset into the management mode that enables the at least one physical component of the asset to be physically managed comprises:
   transporting the asset from an active area to a management area,
   wherein the active area is a portion of a structure in which active assets of the deployment are disposed,
   wherein the management area is physically segregated from the active area.

10. The deployment manager of claim 1, wherein placing the asset into the active mode that disables the at least one physical component of the asset to be physically managed comprises:
    migrating a workload, that was hosted by the asset prior to entering the management mode, from a second asset to the asset,
    transitioning the asset from a management network to an active network,
    locking a structural component that prevents physical access to the asset, and
    transporting the asset from a management area to an active area.

11. A method for managing a deployment, comprising:
    obtaining an asset management request for an asset of the deployment;
    in response to obtaining the asset management request:
       placing the asset into a management mode that enables at least one physical component of the asset to be physically managed,
       wherein placing the asset into the management mode that enables the at least one physical component of the asset to be physically managed comprises: wirelessly unlocking a structural component that prevents physical access to the asset, and wherein placing the asset into the management mode that enables the at least one physical component of the asset to be physically managed comprises: transitioning the asset from an active network to a management network,
    wherein the management network is segregated from the active network, and
    wherein the active network is adapted to service active assets of the deployment;
managing the asset based on the asset management request while in the management mode; and
placing the asset into an active mode that disables the at least one physical component of the asset to be physically managed.

12. The method of claim 11, further comprising:
prior to placing the asset into the management mode:
    identifying a location of the asset;
    making a determination that the location of the asset is unexpected; and
    in response to the determination, remediate the location of the asset.

13. The method of claim 11, wherein placing the asset into the management mode that enables the at least one physical component of the asset to be physically managed comprises:
    migrating at least one workload hosted by the asset to a second asset.

14. A non-transitory computer readable medium comprising computer readable program code, which when executed by a computer processor enables the computer processor to perform a method for managing a deployment, the method comprising:
    obtaining an asset management request for an asset of the deployment;
    in response to obtaining the asset management request:
        placing the asset into a management mode that enables at least one physical component of the asset to be physically managed,
        wherein placing the asset into the management mode that enables the at least one physical component of the asset to be physically managed comprises: wirelessly unlocking a structural component that prevents physical access to the asset, and
        wherein placing the asset into the management mode that enables the at least one physical component of the asset to be physically managed comprises: transitioning the asset from an active network to a management network,
            wherein the management network is segregated from the active network, and
            wherein the active network is adapted to service active assets of the deployment;
    managing the asset based on the asset management request while in the management mode; and
    placing the asset into an active mode that disables the at least one physical component of the asset to be physically managed.

15. The non-transitory computer readable medium of claim 14, wherein the method further comprises:
prior to placing the asset into the management mode:
    identifying a location of the asset;
    making a determination that the location of the asset is unexpected; and
    in response to the determination, remediate the location of the asset.

16. The non-transitory computer readable medium of claim 14, wherein placing the asset into the management mode that enables the at least one physical component of the asset to be physically managed comprises:
    migrating at least one workload hosted by the asset to a second asset.

* * * * *